(12) United States Patent
Roediger et al.

(10) Patent No.: US 6,308,324 B1
(45) Date of Patent: Oct. 23, 2001

(54) MULTI-STAGE PROFILER

(75) Inventors: Robert Ralph Roediger; William Jon Schmidt, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,404

(22) Filed: Jun. 10, 1999

(51) Int. Cl.⁷ ..................................................... G06F 9/45
(52) U.S. Cl. .................. 717/9; 717/4; 717/7; 712/240
(58) Field of Search ................ 717/9.4, 5.7; 712/240, 712/239, 234, 233, 227

(56) References Cited

U.S. PATENT DOCUMENTS

| | | | |
|---|---|---|---|
| 5,212,794 | * 5/1993 | Pettis et al. | 717/9 |
| 5,655,122 | * 8/1997 | Wu | 717/5 |
| 5,659,752 | * 8/1997 | Heisch et al. | 717/4 |
| 5,689,712 | * 11/1997 | Heisch | 717/4 |
| 5,828,883 | * 10/1998 | Hall | 717/4 |
| 5,896,538 | * 4/1999 | Blandy et al. | 717/4 |
| 6,151,706 | * 11/2000 | Lo et al. | 717/9 |

OTHER PUBLICATIONS

Pettis & Hansen, "Profile Guided Code Positioning," Proceedings of the ACM SIGPLAN'90 Conference on Programming Language Design and Implementation, Jun. 18–22, 1990, pp. 16–27.*

Chekuri et al., "Profile–Driven Instruction Level Parallel Scheduling with Application to Super Blocks," Proceedings of the 29th Annual IEEE/ACM Int'l Symposium on Microarchitecture MICRO–29, Dec. 2–4, 1996, pp. 58–67.*

Schmidt et al., "Profile–Directed Restructuring of Operating System Code," IBM Systems Journal vol. 37, Issue 2, 1998, pp. 270–297.*

* cited by examiner

Primary Examiner—Tuan Q. Dam
(74) Attorney, Agent, or Firm—Steven W. Roth

(57) ABSTRACT

A profiler that operates in a multi-stage environment is disclosed. As program code undergoes a series of transformations, branches of interest are selected and tracked. Regardless of how many transformations are involved only a single instrumentation/data gathering phase is required. The gathered profile data is then used to perform various optimizations at the differing transformation stages.

17 Claims, 21 Drawing Sheets

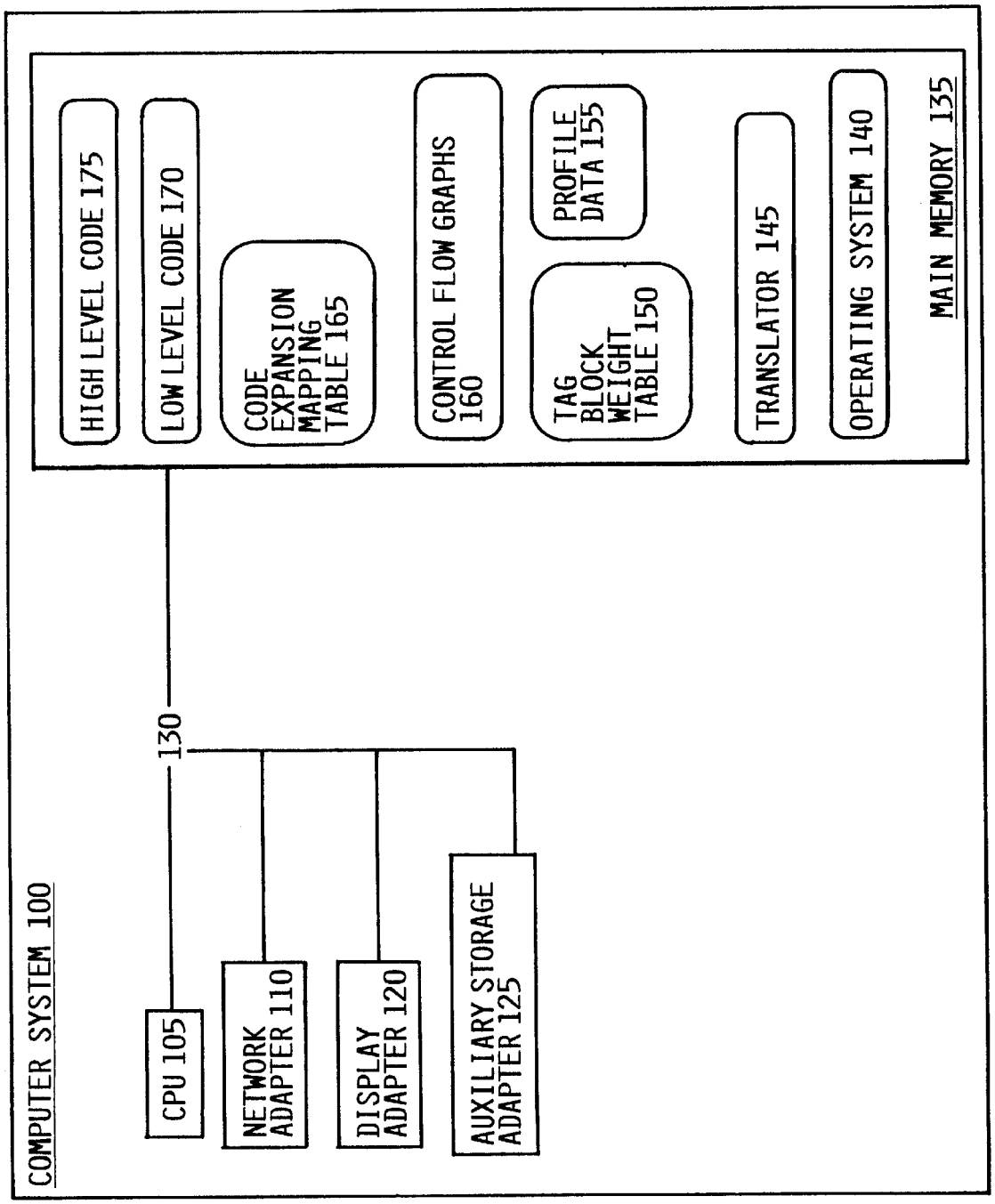

| Code Construct Name | Statement Set | # of Branches | Branch Locations |
|---|---|---|---|
| MIN | {3,5} | 1 | (ii) |
| MEMCPY | {10} | 1 | (ix) |
| MEMCPY | {10} | 1 | (xv) |

FIG. 5C

| | ARC NUMBER | DATA COLLECTED |
|---|---|---|
| 502 | (1) | {20} |
| 517 | (2) | {95} |
| 532 | (3) | {850} |
| 542 | (4) | {1900} |
| 562 | (5) | {2500} |
| 557 | (6) | {100} |

FIG. 7A

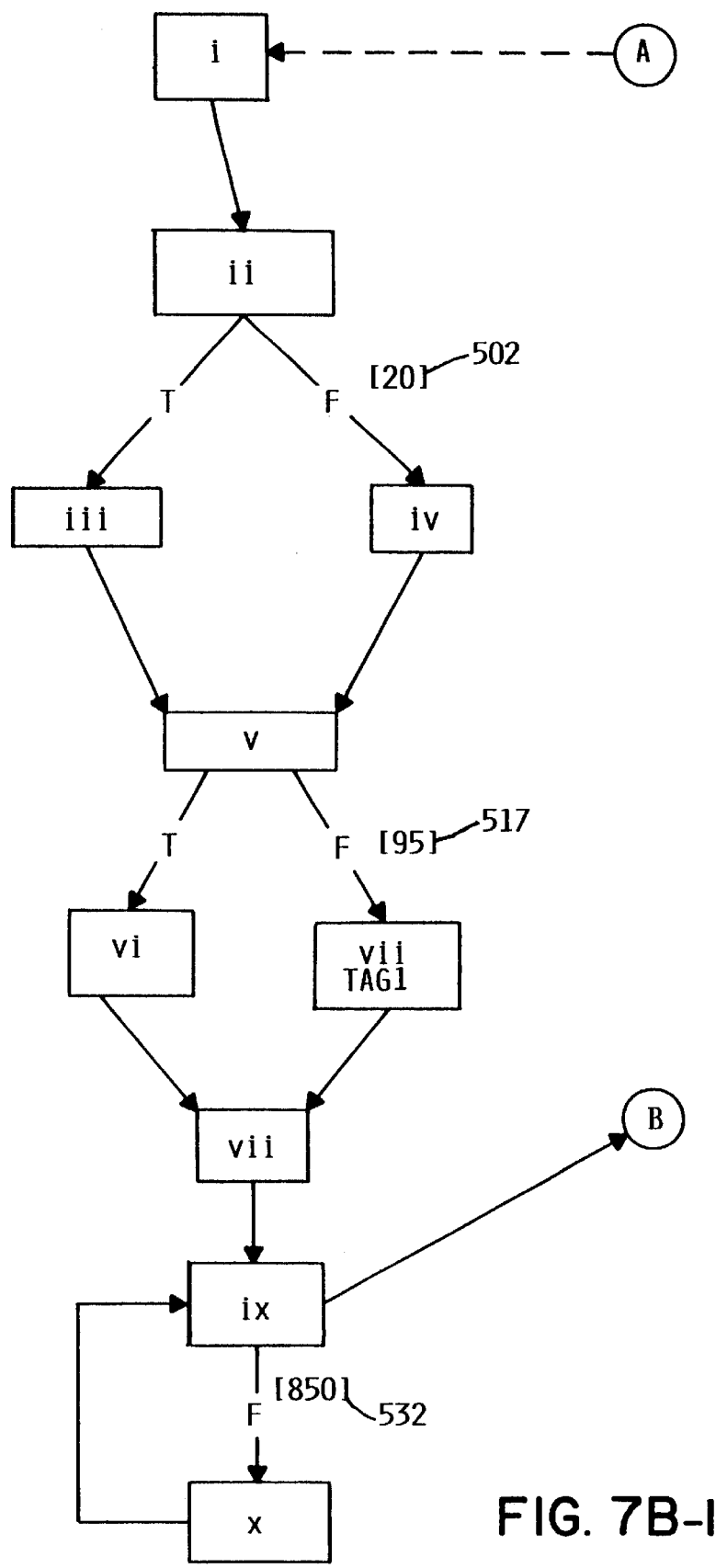
FIG. 7B-I

| TAG | WEIGHT |
|-----|--------|
| 1 | 95 |
| 2 | 0 |
| 3 | 1900 |
| 4 | 100 |

MULTI-STAGE PROFILER

FIELD OF THE INVENTION

The present invention relates to data processing systems. More particularly, the present invention relates to profiling compilers.

BACKGROUND OF THE INVENTION

The use and the popularity of computer systems have steadily increased since around the middle of the twentieth century. While this trend has been fuelled by many different advances in computer system technology, some fundamental aspects of overall computer system value remain unchanged. Perhaps the most basic touchstone of computer system value has been, and continues to be, the speed at which decisions can be made and calculations can be performed.

While the computer system's processor is arguably the most important computer system component, the speed at which a computer system performs does not depend solely on that one system component. The speed of other computer system components, such as computer system memory, can also dramatically effect overall computer system performance. Another important component is the computer system's programs. When a computer system carries out its tasks, it does so at the direction of its programs. The programs are said to "execute" on the computer system's processor. Thus, program execution speed is also a key element of overall system performance.

Computer programs are constructed using one or more programming languages. Like words written in English, a programming language is used to write a series of statements that have particular meaning to the drafter (i.e., the programmer). The programmer writes programs that execute on the computer system's processor to perform a particular function or calculation. These programs are written in human readable form by the programmer and then transformed through the use of a compiler into a form that can be understood by the computer system's processor. A fundamental concept found in virtually every programming language is the ability to direct the computer system to take different actions based on one or more conditions. For example, a programmer creating a program that generates account balances may write some code that instructs the computer system to display negative account balances in red and positive account balances in black. The high-level code statement written to represent this idea may be something like: IF account balance <$0, THEN display account balance in red, ELSE display account balance in black. When compiled, high-level statements such as this are broken down into substatements such that the single statement set forth above would ultimately be represented by several smaller statements. Essentially, then, the compilation process converts these high level statements into a stream of smaller, substatements. Decisions contained in the statement stream, like the account balance decision, take on the form of what are called branches. It is the branches that create the different paths of statements which allow the program to generate different results based on different conditions. When taken together the branches of a program are said to form a branching structure.

Sometimes the branches and other statements of the statement stream can be understood directly by the computer system's processor. Other times, though, one or more subsequent transformations may be required to further break down the statements into even smaller substatements that can be understood by the computer system's processor. While the need for this multiple transformation scheme is brought on by factors that are not important here, the individual transformations within the series of transformations do provide an opportunity to optimize the statement stream to make it execute faster on the processor. A special type of compiler, called an optimizing compiler, is used for this purpose. While there are any number of well-known optimization techniques used to make the statement stream execute more quickly, it should be understood that some optimizations are best performed early in the transformation process while others are best performed late in the transformation process. In general early optimizations can be performed without concern for the specific type of processor involved, while late optimizations tend to be specific to a particular type of processor.

With that being said, another technique, called profiling, is used to enhance the various optimization techniques. The basic idea behind profiling involves 1) gathering information during execution of a program and 2) using the gathered information in a subsequent recompile to better optimize the program. While profiling techniques themselves come in a variety of forms, the profiling technique at issue here is referreed to as instrumentation. Instrumentation is performed by a mechanism in the compiler that is called an instrumenting profiler. An instrumenting profiler operates by inserting special instructions into the program during compilation. These special instructions, called hooks or branch counters, are placed at key branch locations in the program. Then, when the program executes, these hooks are used to keep track of the frequency with which the different branch statements are executed. The frequencies are essentially a measure of how many times particular paths are taken through the program's statements. As mentioned, this information is then used during a subsequent recompile to optimize the speed at which the program executes.

The problem addressed within this patent pertains to the use of instrumenting profilers in situations that require multiple transformations of the computer program. As mentioned earlier, the existence of multiple transformations provides an opportunity for both early and late optimizations. However, the multiple transformations also create a problem relative to instrumenting profilers because each time the program is transformed in the compilation process a new branching structure may be created. The problem, then, is how to select a branching structure for instrumentation. Which one should be chosen? Choosing a branching structure from an early transformation does not allow for an understanding of all branches that are introduced in subsequent transformations, but choosing a branching structure that is created in a later transformation means that the gathered information will not be meaningful, and thus useful, for the high-level optimizations that occur as part of earlier transformations.

One solution to this problem is to perform the instrumentation/recompilation process several times by using the branching structures generated at each level of transformation. While this approach does result in good overall optimization of the program, it is takes a great deal of time and effort, making it impractical in today's commercial environment where overall "time to market" is of paramount concern. Another solution is to simply rearrange the program manually (i.e, guess) for one or more branching structures, but of course such an approach is a "hit or miss" proposition.

Thus, today's computer system designers must decide whether to bypass the performance gains offered by profiling or to use an inefficient or inaccurate process.

SUMMARY OF THE INVENTION

The present invention uses an optimizing compiler to create and use profile data based on more than one branching structure. This is accomplished by marking branches of interest in a branching structure from an early transformation such that these branches can be identified in a branching structure which results from a later transformation. After profile data is gathered based on the later transformation, profile data attributable to the marked branches can be used during high-level optimization.

These and other features of the present invention will be explained in further detail in the text associated with the following drawings.

DETAILED DESCRIPTION

Figures 1, 8A:
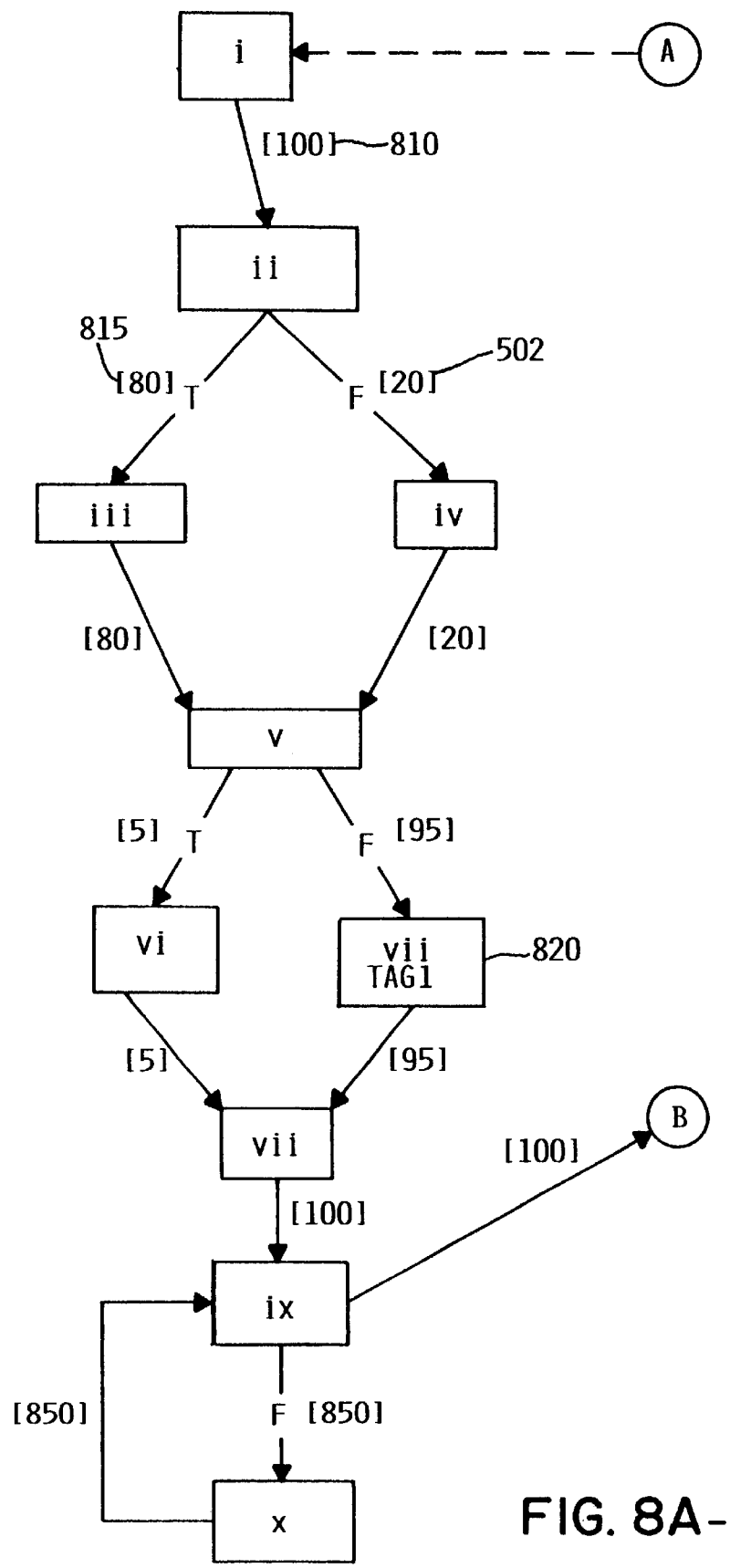
FIG. 1 is a block diagram of the computer system that is utilized to implement the preferred embodiment of the present invention.
Figures 2, 8A:
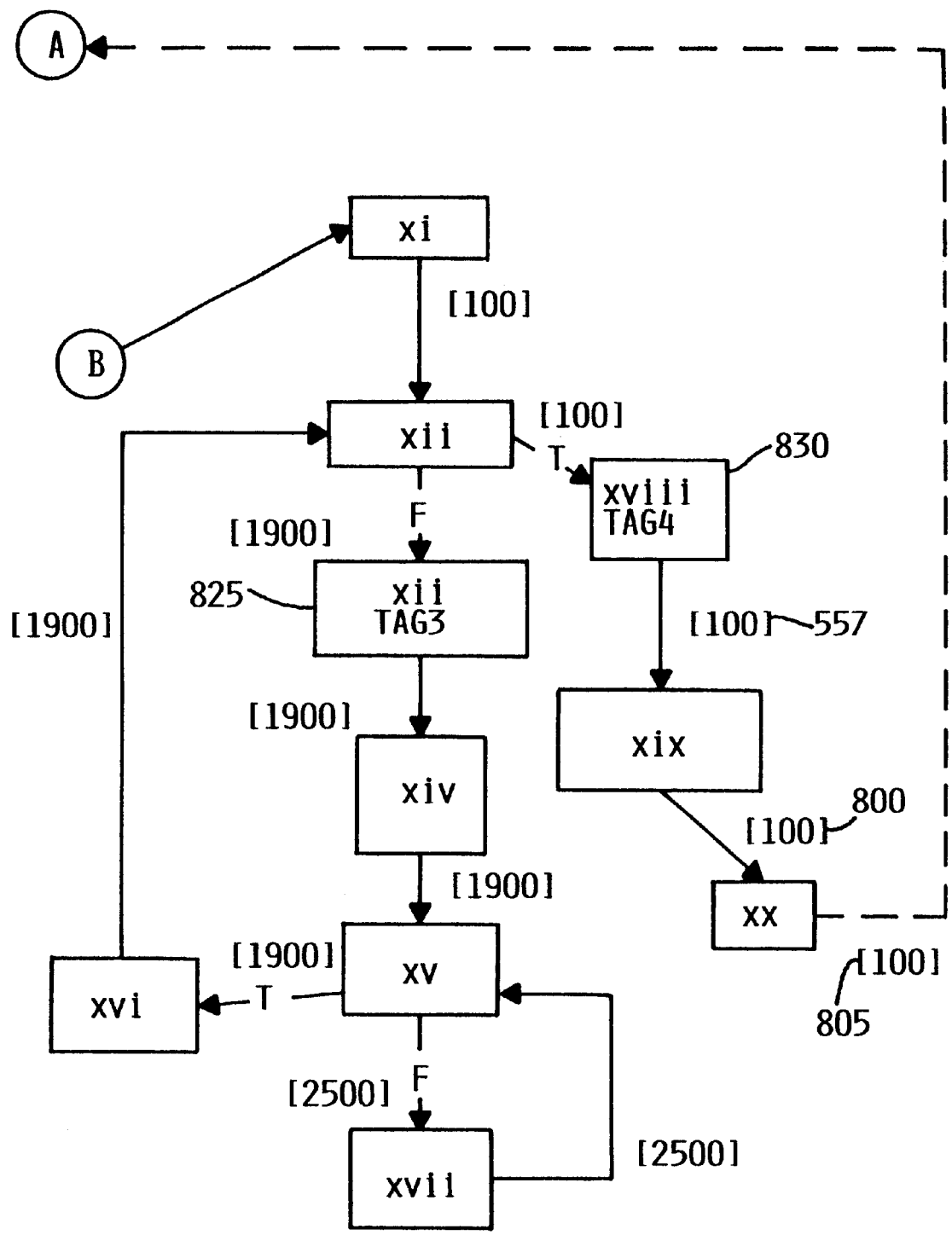

Turning now to the drawings, FIG. 1 is a block diagram of the computer system of the preferred embodiment. Computer system 100 is an enhanced IBM Personal Computer 300PL; however, it should be understood that the present invention is not limited to any one make or type of computer system. As shown, computer system 100 comprises main or central processing unit (CPU) 105, which is connected to network adapter 110, display adapter 120, auxiliary storage adapter 125, and main memory 135. These system components are interconnected through the use of system bus 130.

CPU 105 is a 233 MHZ Pentium Processor made by Intel Corporation. However, it should be understood that the present invention is not limited to any one make of processor and that the invention could be practiced using, some other type of processor such as a co-processor or an auxiliary processor. Auxiliary storage adapter 125 is used to connect mass storage devices (such as a Hard Disk Drive) to computer system 100.

As shown, main memory 135 contains operating system 140, translator 145, tag block weight table 150, profile data 155, control flow graphs 160, code expansion mapping table 165, low-level code 170, and high-level code 175. Translator 145, tag block weight table 150, profile data 155, and code expansion mapping table 165 are used within the preferred embodiment to generate control flow graphs 160, low-level code 170, and high-level code 175.

Computer system 100 utilizes well-known virtual addressing mechanisms that allow its programs to behave as if they have access to a single, large-storage entity (i.e., instead of access to multiple, smaller storage entities such as main memory 135 and a HDD). Therefore, while certain mechanisms and constructs are shown to reside in main memory 135, those skilled in the art will recognize that these programs are not necessarily all completely contained in main memory 135 at the same time. For example, portions of operating system 140 will reside in main memory 135 while executing on CPU 105, but will at other times reside on an attached HDD. (The term memory is used herein to generically refer to storage that spans the entire virtual address space of a computer system, irrespective of the particular physical devices that make up that storage.)

Display adapter 120 is used to directly connect a display device to computer system 100. Network adapter 110 is used to connect computer system 100 to other computer systems.

As a final preliminary matter, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission-type media, such as digital and analog communications links.

Process Overview

Figure 2A:
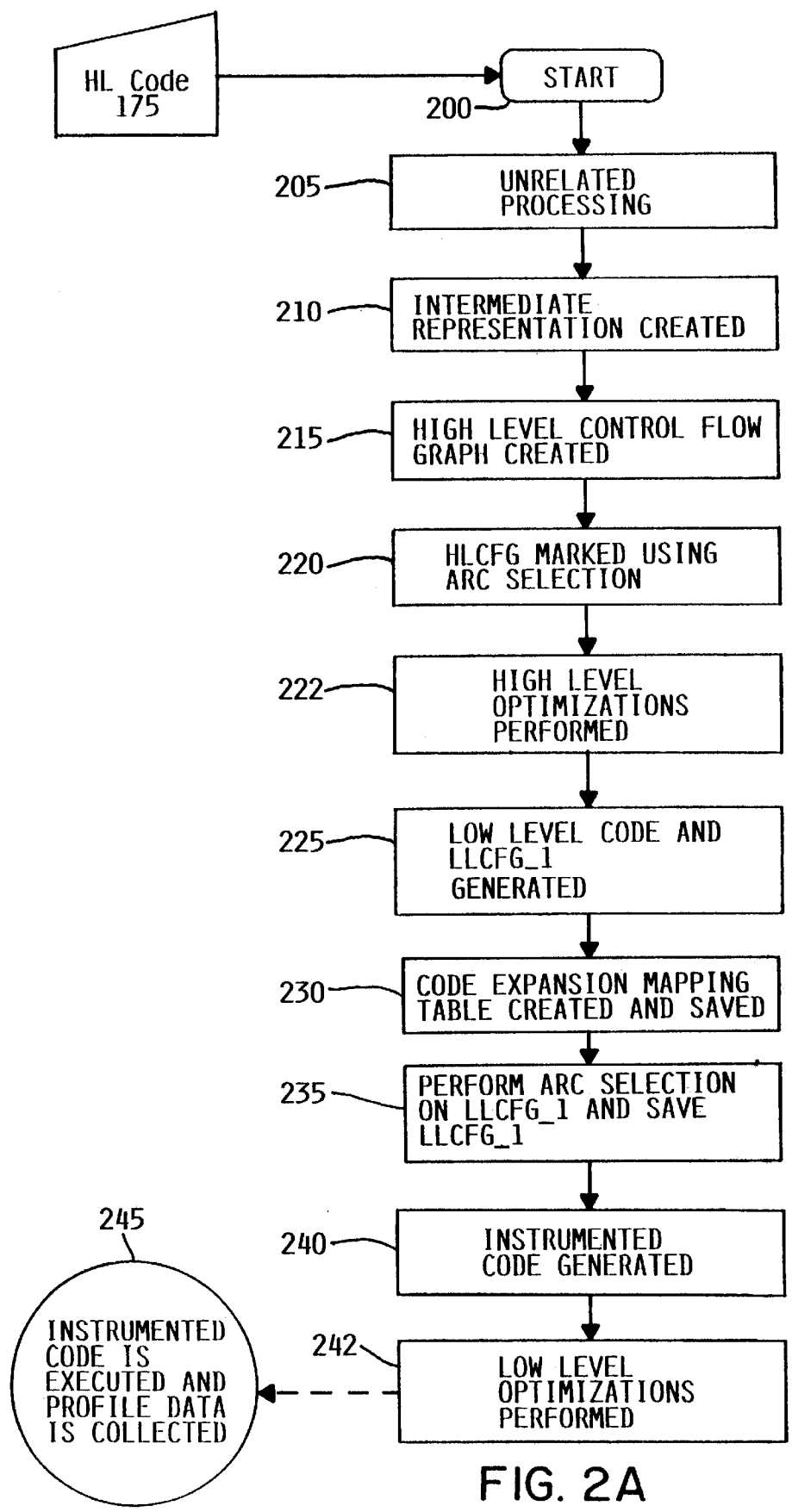
FIGS. 2A and 2B are flow diagrams showing steps used to carry out certain processing of the translator of the preferred embodiment.
Figure 2B:
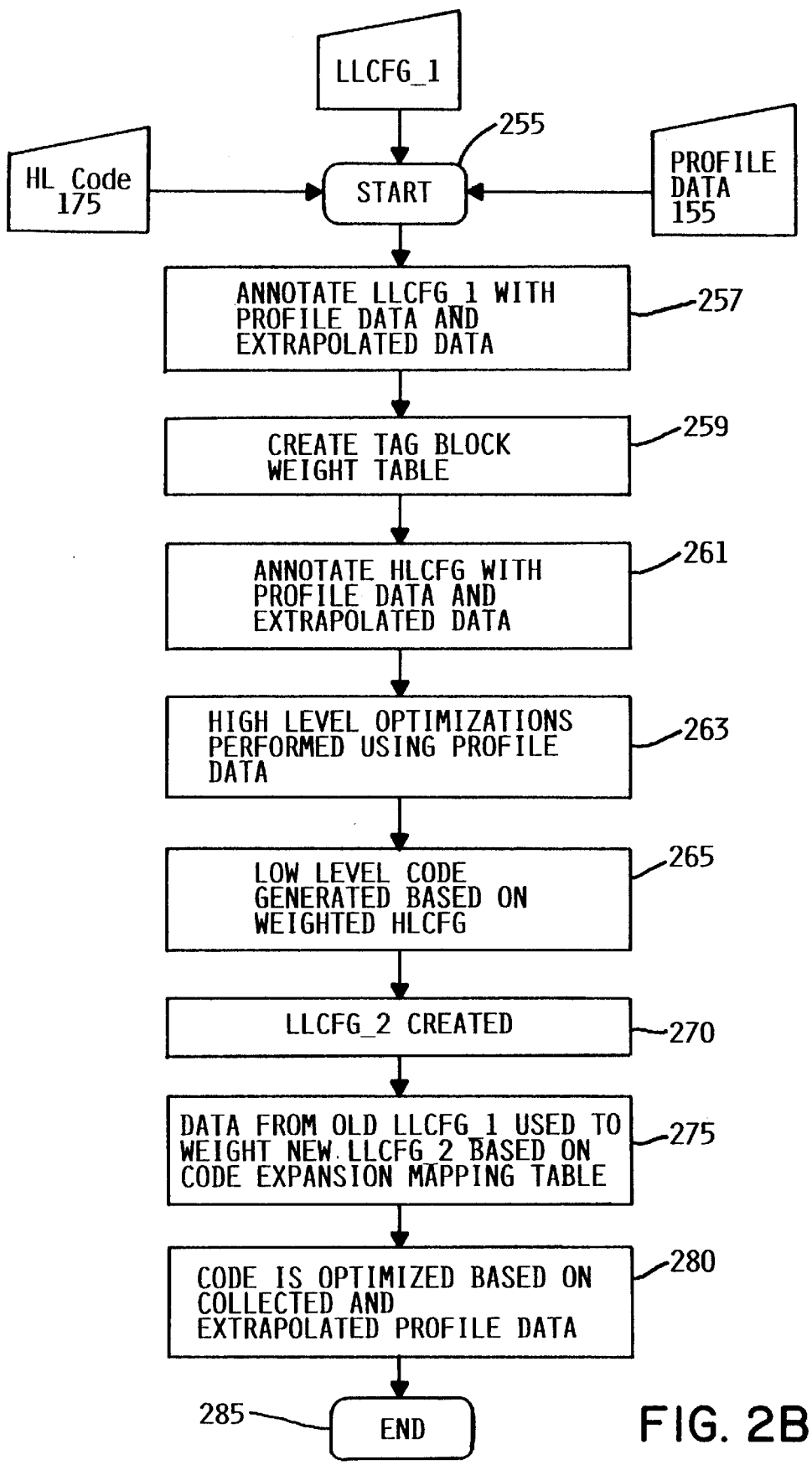

FIGS. 2A and 2B are diagrams that show the overall process used by the mechanisms of the preferred embodiment to create and use profile data based on more than one branching structure. An example applying actual program statements to these process steps immediately follows this Process Overview section.

Translator 145 is initiated in block 200 of FIG. 2A. The particular way in which translator 145 is initiated is not important to the benefits and advantages of the present invention. However, it should be noted that translator 145 is given a high-level code module (see high-level code 175) as input at start-up. High-level code 175 is, of course, the code that is to be optimized by translator 145. As such, high-level code 175 represents an initial representation of the computer program that is to be optimized. After certain unrelated processing {block 205}, translator 145 creates an intermediate representation of high-level code 175 {block 210}. As its name suggests, an intermediate representation is one that is considered "in between" that of high-level code 175 and low-level code 170. After the intermediate representation is created, translator 145 creates and saves a high-level control flow graph (HLCFG) {block 215}. Processing block 215 fundamentally involves the standard control flow graph construction that is well known in the compiler art. Readers seeking more information on control flow graph construction should refer to the book entitled: *Compilers— Principles, Techniques, and Tools* by Aho et al., ISBN 0-201-10088-6.

Certain arcs within the HLCFG are then selected using well-known arc selection techniques: Schmidt, Roediger et al., "Profile-Directed Restructuring of Operating System Code," *IBM Systems Journal* 37:2, 1998, pp. 270–297. The selected arcs are then marked by assigning a unique identifying number, or tag, that is carried along with the arc during subsequent optimizations {block 220}. The locations of the selected arcs are thus retained in the high-level branching structure so that profile data can be collected for them in a subsequent stage (i.e., so that they can be "instrumented"). Once the locations of the arcs of interest have been saved in this manner, translator 145 performs its complete suite of machine-independent optimizations on the high-level code {block 222}. During this processing, the branching structure may be altered. In particular, a tagged arc may be proven to be unreachable during program execution, in which case, translator 145 may remove it. Also, translator 145 may find it beneficial to duplicate a tagged arc (for example, when unrolling a loop), in which case, both copies of the tagged arc are assigned to the identical tag.

During optimization, translator 145 associates a statement number set with each instruction. Initially, the statement number set for an instruction corresponds to the source line number from which that instruction was generated. As optimization progresses, instructions may be created that perform the function of two or more original instructions (as when eliminating common subexpressions, for example). Such an instruction is annotated with a statement number set that is the union of the statement number sets of the original instructions that it represents.

Once all high-live optimizations have been completed, low-level code 170 and the associated low-level control flow graph (referred to here as LLCFG__1) are created by translator 145 {block 225}. The generation of low-level code from high-level code generally results in an expanded, more detailed representation of the code. For example, it may be appropriate to view an operation (such as the copying of a block of memory) at a higher level of abstraction during machine-independent optimizations on the HLCFG, but to expand this operation into detailed machine instructions for machine-dependent optimizations on the LLCFG__1. We refer to the single operation in the HLCFG as a "high-level code construct," and the act of expanding it into lower level instructions as a "code expansion." For purposes of this invention, we are only concerned with code expansions that introduce new branching structure. During generations of low-level code, the tagged arcs in the HLCFG are represented as basic blocks inserted along the corresponding arcs in the LLCFG__1. Each of these "tag blocks" contains a pseudo-instruction identifying its corresponding tag.

Figure 5A:
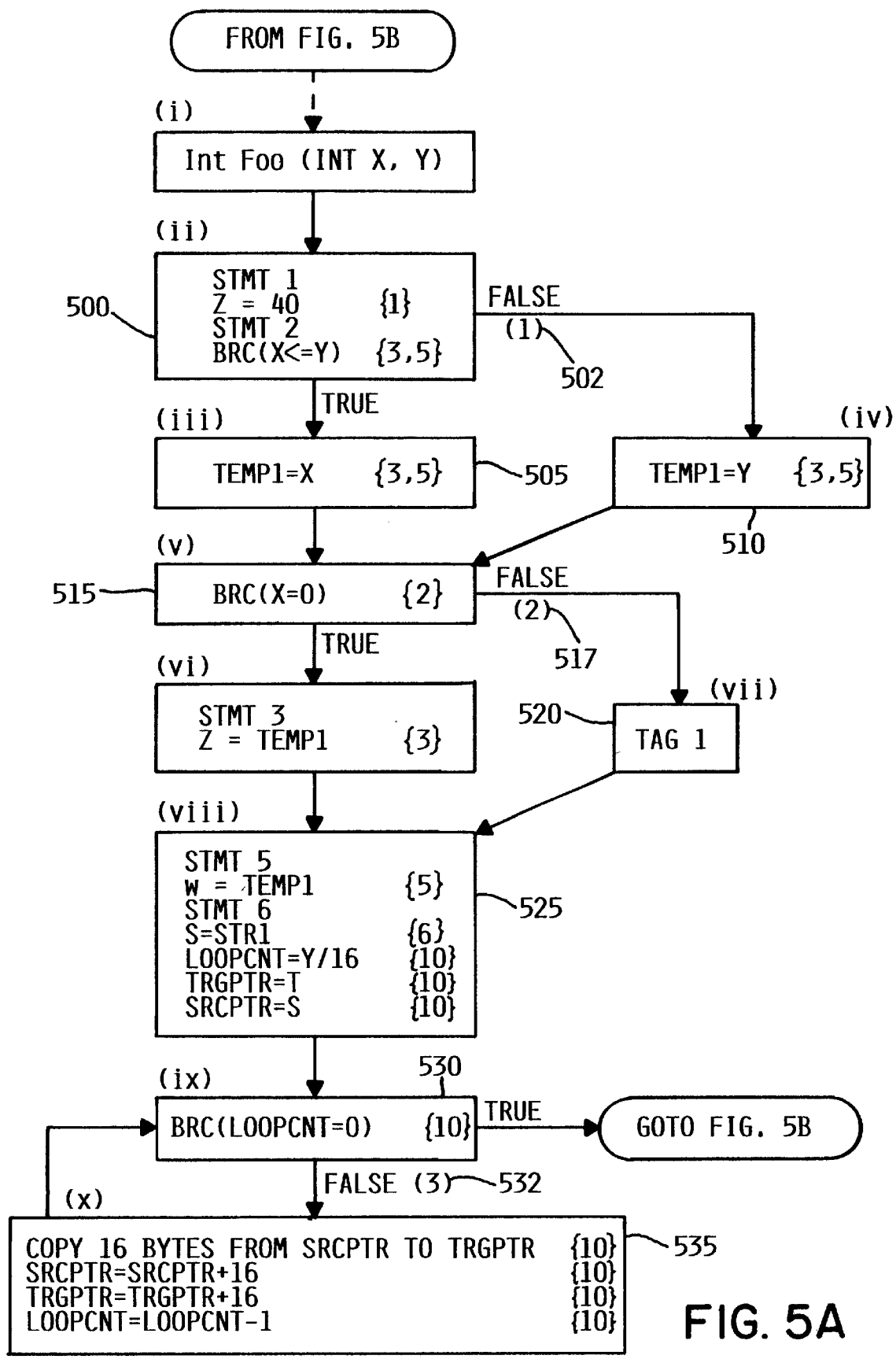
Figure 5B:
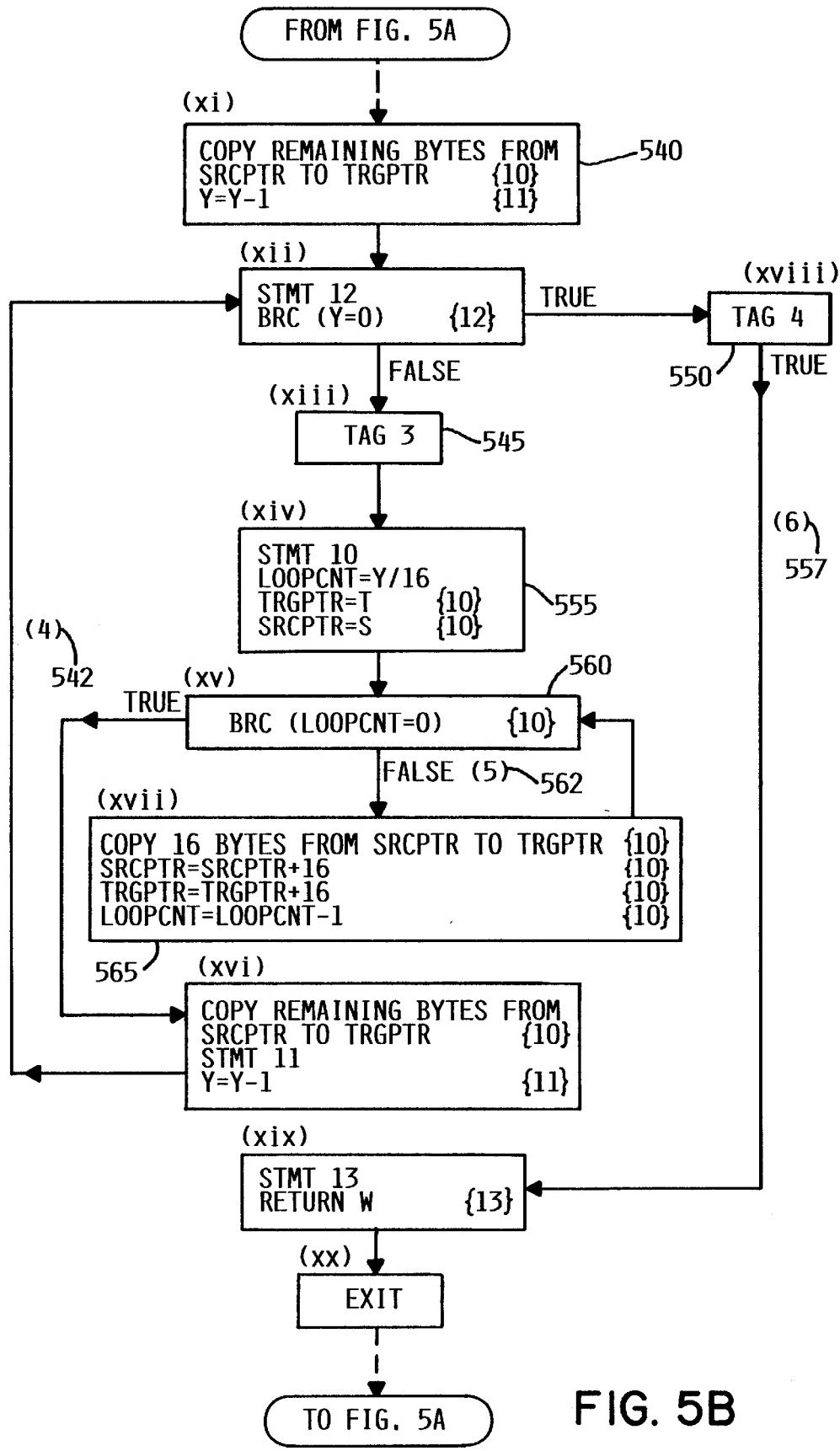

Translator 145 then creates and saves code expansion mapping table 165. Code expansion mapping table 165 is created by comparing the HLCFG with the LLCFG__1. Each high-level code construct is mapped to its associated code expansion by recording a "signature" of relevant information in the expansion. The preferred embodiment records the code construct name, the statement set of the resulting code expansion, the number of branches created by the code expansion, and the location of the basic blocks in the LLCFG__1 that contain these branches (see FIG. 5C for an example code expansion mapping table). As will be shown in more detail in subsequent paragraphs, code expansion mapping table 165 is used to associate profile data generated based on the current low-level control flow graph (LLCFG__1) with branches that appear on a future low-level control flow graph (LLCFG__2).

After creating code expansion mapping table 165, translator 145 performs arc selection again, this time on LLCFG__1 {block 235}. At this time, translator 145 saves a representation of LLCFG__1, recording which arcs were just selected and which blocks contain tags associated with arcs in HLCFG. Translator 145 then instruments the selected arcs {block 240}. As discussed above, instrumentation amounts to inserting code that counts the number of times selected branches are taken during execution (referred to here as branch counters). Translator 145 then performs its low-level optimizations and final code generation on the instrumented code {block 242}.

The instrumented code is then executed and the profile data is collected in the way well known to those skilled in the art {block 245}.

Figure 8B:
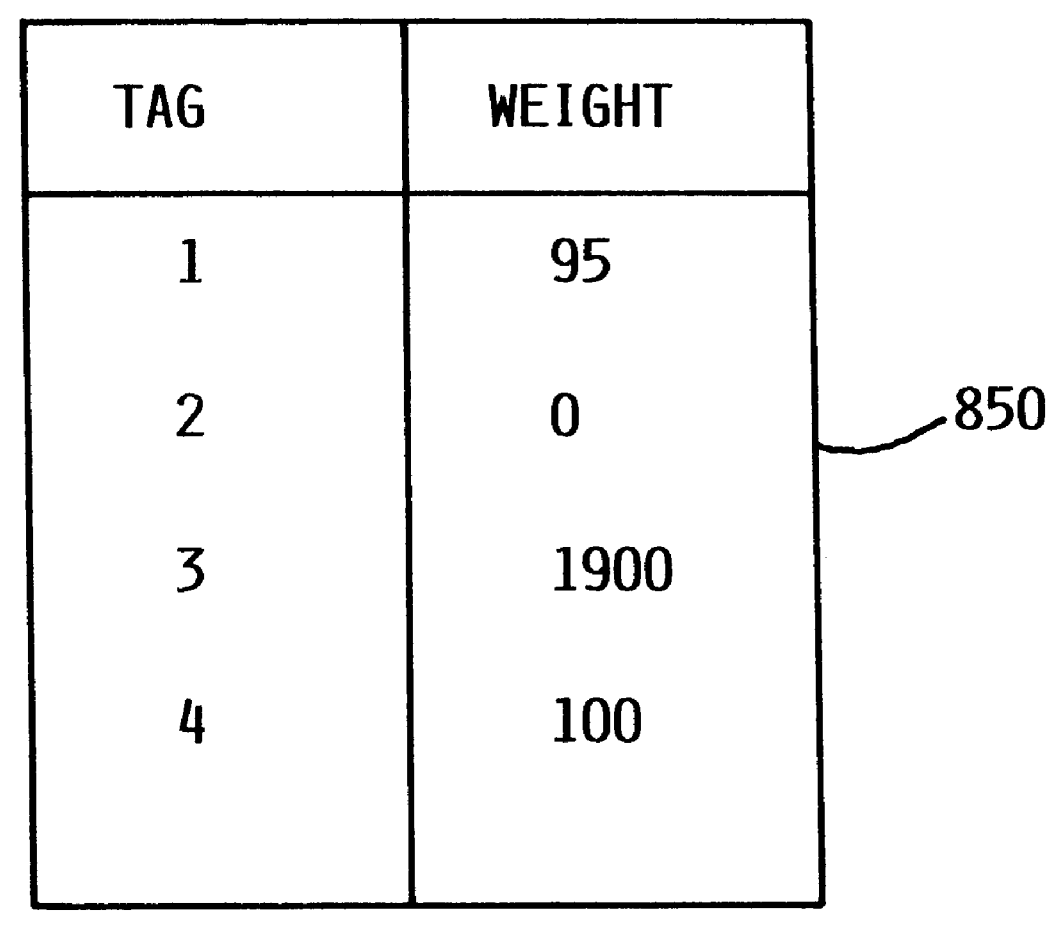

Turning now to FIG. 2B, the collected profile data (shown as profile data 155) and high-level code 175 are provided as input to translator 145 {block 255}. Translator 145 then fully annotates LLCFG__1; using weights collected during profiling and using weights that can be extrapolated from review of the profile data 155 and the branching structure {block 257}. (Again, see Schmidt, Roediger et al. for a description of how this may be accomplished.) By weights we mean the values derived during execution from the branch counters that were inserted into low-level code 170. Once a fully annotated LLCFG__1 has been created, a tag block weight table is created in processing block 259. FIG. 8B shows an example tag block weight table. The tag block weight table contains one entry for each unique tag for which a tag block exists in LLCFG__1. The entry for a tag contains the sum of the profile weights associated with tag blocks that contain that tag. (Note that there may be several tag blocks containing the same tag, if a tagged arc was duplicated during high-level optimizations 222). A HLCFG for high-level code 175 is again created, and the arc selection algorithm for the HLCFG is repeated. These steps are not shown on FIG. 2B. Please refer to the text associated with processing blocks 210, 215, and 220 of FIG. 2A for information on high-level control flow control graph creation.

Once the HLCFG is created anew, it is annotated by using the tag weights from the tag block weight table and by using weights that can be extrapolated from the tag weights and the branching structure {block 261}. Specifically, each entry in the tag block weight table corresponds to a selected arc in the HLCFG; this arc is annotated with the weight from the tag block weight table entry. If a selected arc in the HLCFG has no corresponding entry in the tag block weight table, this means that the arc was previously found to be unreachable. Each such arc is annotated with a weight of zero. The HLCFG is then used to perform high-level optimizations on the code {block 263}, this time using the profile weights to assist in optimization. Once these optimizations take place, low-level code 170 is then generated in optimized form based on the weighted HLCFG {block 270}. Those skilled in the art understand that there are any number of optimizations that can be performed based on a weighted control flow graph, and that the particular optimizations performed are not important to the benefits and advantages of the present invention.

Once the low-level code is generated by translator 145, a new low-level control flow graph (LLCFG__2) is created. LLCFG__2 is then weighted in processing block 275. Though these logical steps {blocks 265 and 275} are shown separately on FIG. 2B, they would likely occur together in practice. In any case, it is important to note here that the collected profile data (profile data 155) is based on LLCFG__1, which represents different low-level code than that generated in block 270. Said another way, some portions of the new low-level code will be the same as that generated in block 225 and some portions will be different. The differences exist because the optimizations performed in processing blocks 222 and 263 may have had different effects on the high-level code, since the availability of profile data in block 263 permits more optimizations to be performed. It becomes important here then to apply the profile information regarding the portions that are the same to LLCFG__2 so that LLCFG__2 can be used to optimize the new low-level code. It is for this purpose that the preferred embodiment includes code expansion mapping table 165. As mentioned earlier, code expansion mapping table 165 comprises the various code expansions found in LLCFG__1, and the statement set, number of branches, and branch locations for each code expansion (see FIG. 5C as an example). The code expansion mapping table is used to apply the profile information on a statement set by statement set basis {block 280}.

Specifically, during generation of the new low-level code, high-level constructs may again be expanded into more detailed branching structure. Each such construct is examined to see if its signature has one or more matches in the code expansion mapping table. In the preferred embodiment, an entry in the table matches the construct if it has the same name and produces the same number of new low-level branches as the new expansion of the construct, and if the statement number set of the construct and that of the table entry have a non-empty intersection. When one or more matches are found, the branch probabilities (determined from profile data 155) of the branches recorded in the table entries are used to apportion the profile weight of the high-level construct among the corresponding branches in LLCFG_2. This will be more easily seen in the example below. If a construct does not have a match in the table, the profile weight of the construct must be apportioned using some static estimation method (such as assigning equal weight to both arcs originating from one branch).

Once profile weights have been assigned to all arcs in LLCFG_2, low-level optimizations are again performed {block 280}, this time using the profile data to enhance optimization. The final optimized machine code is then produced.

DETAILED EXAMPLE

Figure 3:
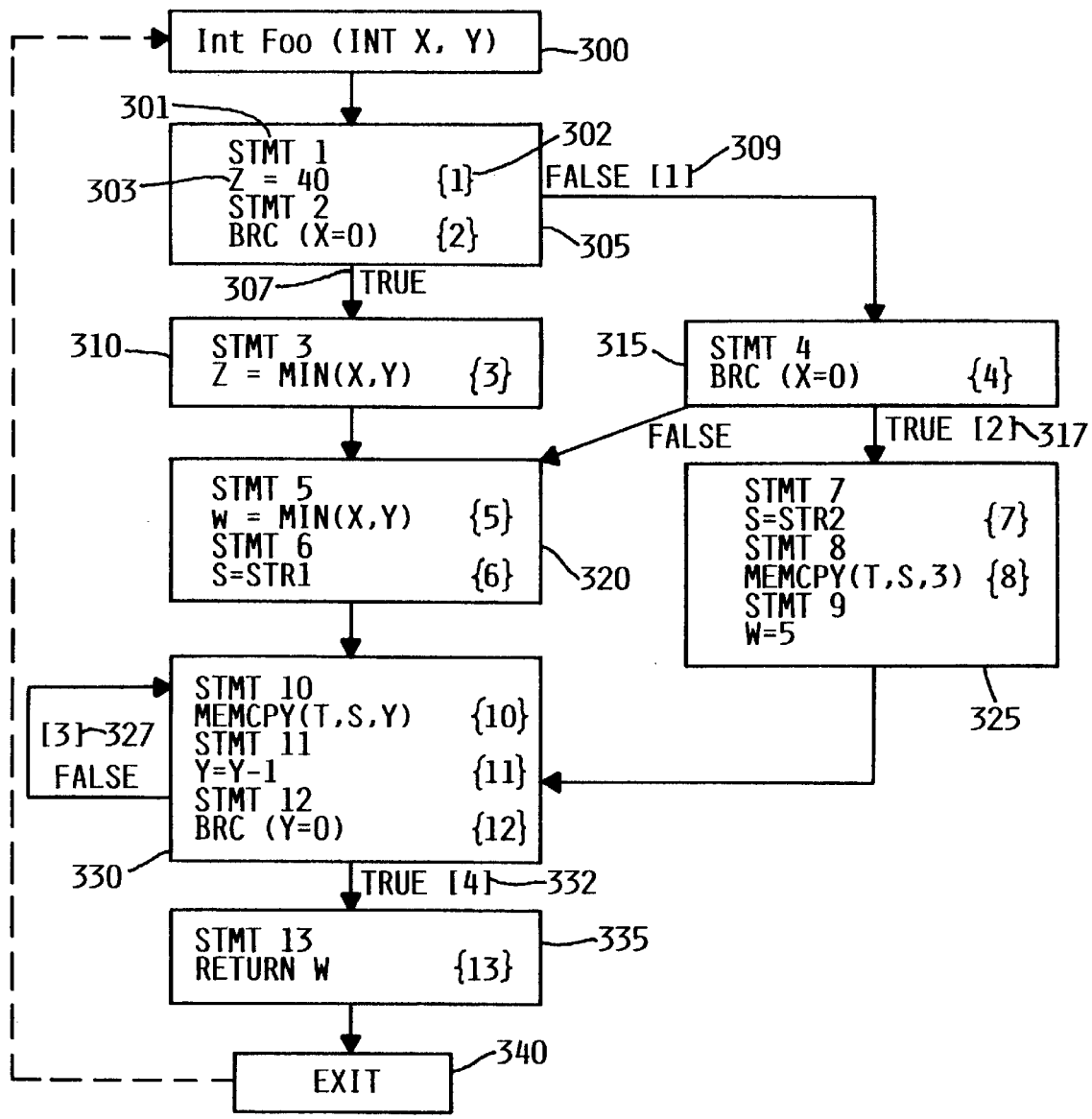
FIGS. 3 through 12B are diagrams of example control flow graphs and other structures of an example program which is operated on by the translator of the preferred embodiment.

As stated earlier, FIGS. 3 through 12B are diagrams of example control flow graphs and other structures of an example program that is operated on by the translator of the preferred embodiment. A high-level control flow graph (HLCFG) for the program Foo is created based on an intermediate representation of the program called Foo. This HLCFG is shown on FIG. 3. As with all control flow graphs, the control flow graph shown in FIG. 3 comprises basic blocks (e.g., basic blocks 305 and 310) that are interlinked by the various paths (e.g., path 307) that make up the branching structure of the particular program. Inside each basic block are one or more statement representations (e.g., statement identifier 301 and statement 303). When taken together, the basic blocks, statement representations, and branching structure make up the program Foo. Referring briefly back to FIG. 2A, the control flow graph depicted in FIG. 3 is the HLCFG created in block 215 and marked in block 220.

Of particular note on FIG. 3 are the arcs (also called branches and paths herein) that have been marked. (Again, see FIG. 2A, block 220.) More specifically, arcs 309, 317, 327, and 332 have been respectively marked with the tags [1], [2], [3], and [4]. This step is important because it is through the use of these tags that the HLCFG weight table is created and then ultimately used to annotate a new HLCFG (see blocks 259 and 261 of FIG. 2B).

Figure 4:
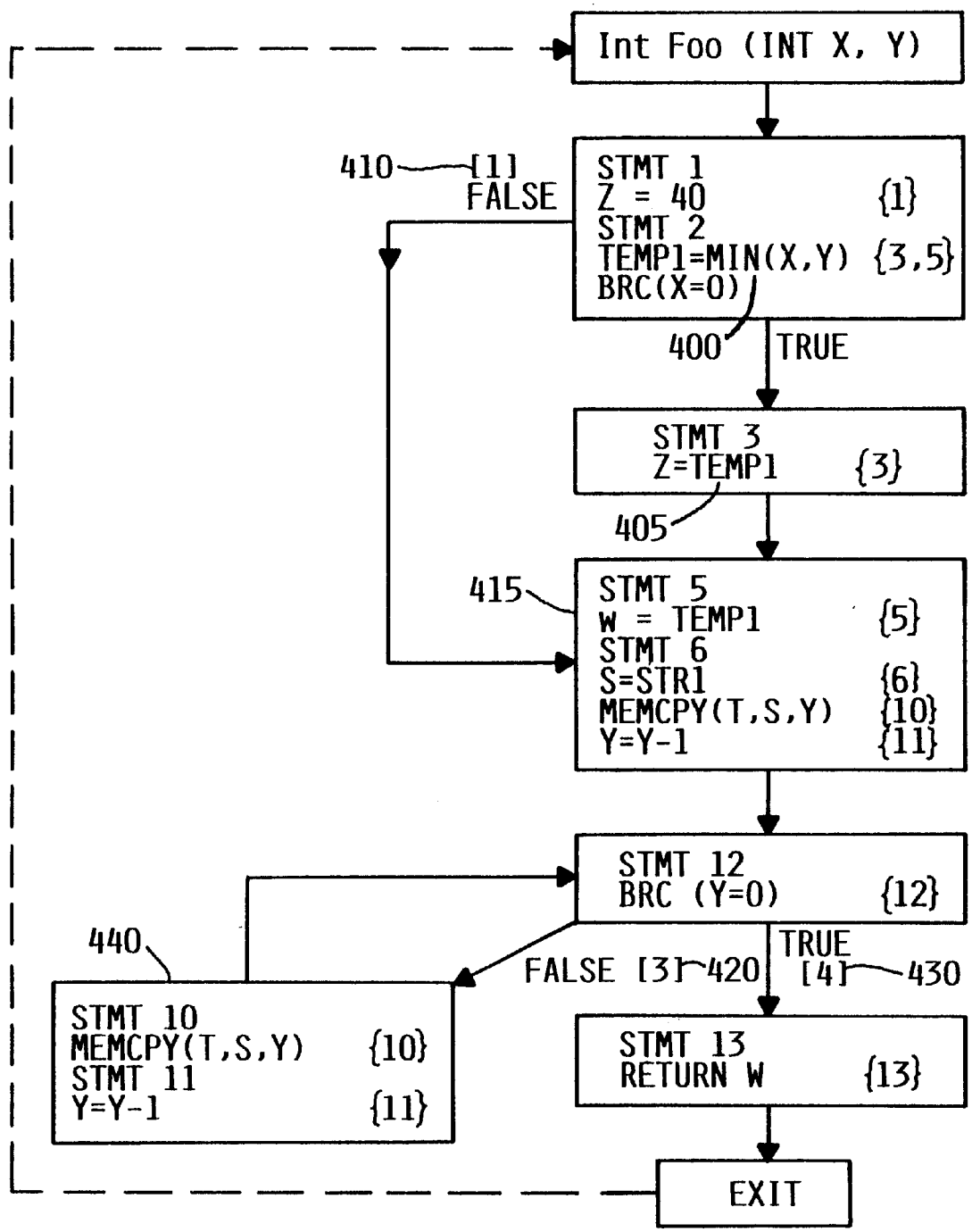

FIG. 4 shows the control flow graph that results from high-level optimizations performed on the HLCFG {FIG. 2A, block 222}. The branch in statement 4, basic block 315 from FIG. 3, was proven to always go to statement 5, leaving statements 7 through 9 unreachable. Thus, statements 4 and 7 through 9 were removed. The loop block (basic block 330) was placed in canonical form with the branch being placed at the top of the loop. This was done by "peeling" out a copy of the loop body and placing it before the loop. By performing these optimizations, we have created optimized, high-level code, which is represented by the optimized HLCFG shown on FIG. 4. Low-level code is then generated based on the optimized HLCFG, which is represented by the Low-Level Control Flow Graph shown on FIGS. 5A and 5B. (See LLCFG_1 of block 225 of FIG. 2A.) The reader should note that there are several code constructs and tagged branches in FIG. 4 that are represented differently in the LLCFG of FIGS. 5A and 5B. In particular, code construct 400 {i.e., MIN(X,Y)} is represented within basic blocks 500, 505, and 510; tag 410 is represented by Tag block 520; code construct 415 {i.e., MEMCPY(T,S,Y)} is represented within basic blocks 525, 530, 535, and 540; tag 420 is represented by tag block 545; code construct 440 {MEMCPY(T,S,Y)} is represented within basic blocks 555, 560, and 565; and tag 430 is represented by tag block 550.

As part of the generation of the low-level code and the associated LLCFG, translator 145 of the preferred embodiment also generates a code expansion mapping table for the program Foo. This table is shown on FIG. 5C. Code expansion mapping table 580 comprises code construct name column 582, statement set column 584, branch number column 586, and branch location column 588. A different code construct is then represented in each row of code expansion mapping table 580. As shown, the code expansion mapping table for the program Foo contains entries for the code constructs MIN 400, MEMCPY 415, and MEMCPY 440 (see FIG. 4 for basic block locations). The importance of the code expansion mapping table of the preferred embodiment is explained in subsequent paragraphs.

After LLCFG_1 and the associated code expansion mapping table have been created (again refer to processing blocks 225 and 230 of FIG. 2A), arc selection is performed on LLCFG_1. As stated above, any of the well-known arc selection techniques can be used to satisfy the needs of the preferred embodiment. Again, these are the arcs for which profile data will be collected during execution of program Foo. The arcs selected here in this example appear on FIGS. 5A and 5B as arcs 502, 517, 532, 542, 562, and 557.

Figure 6A:
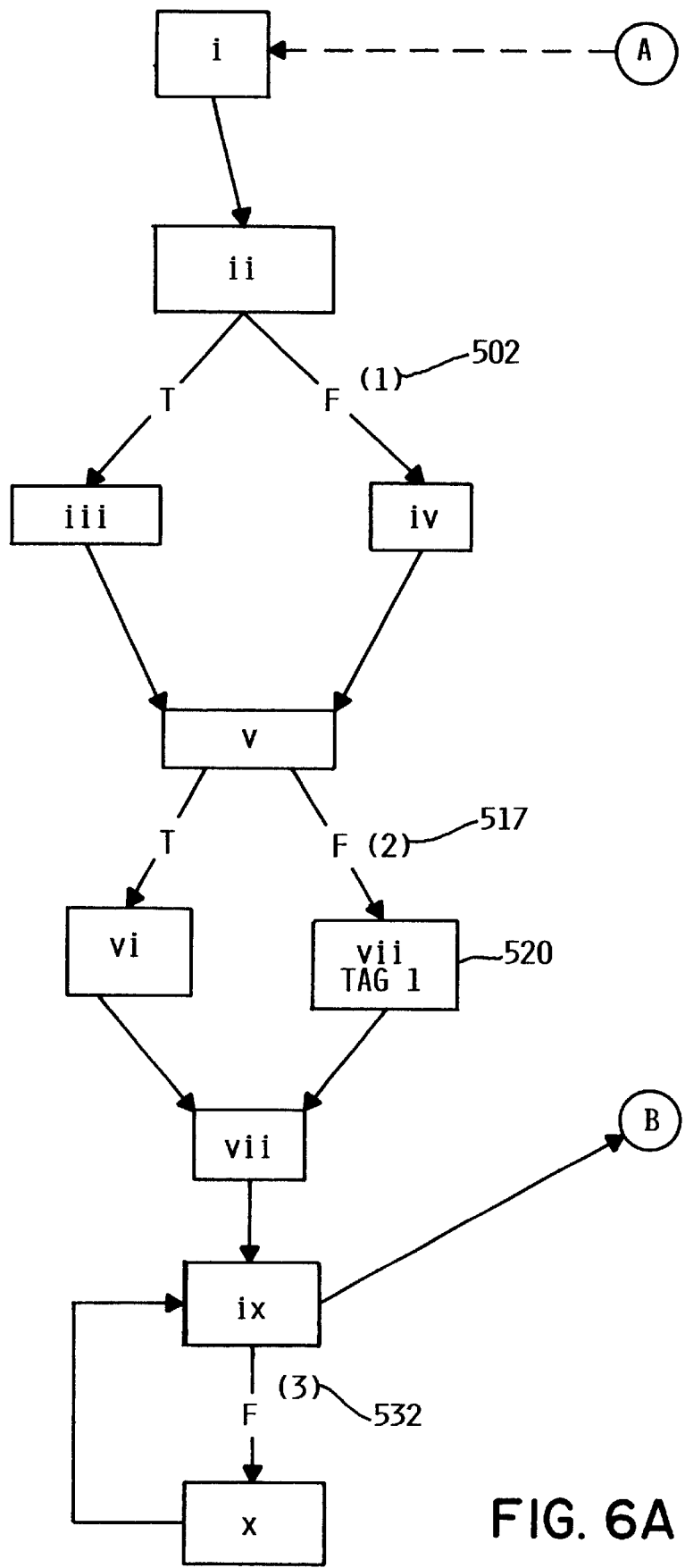
Figure 6B:
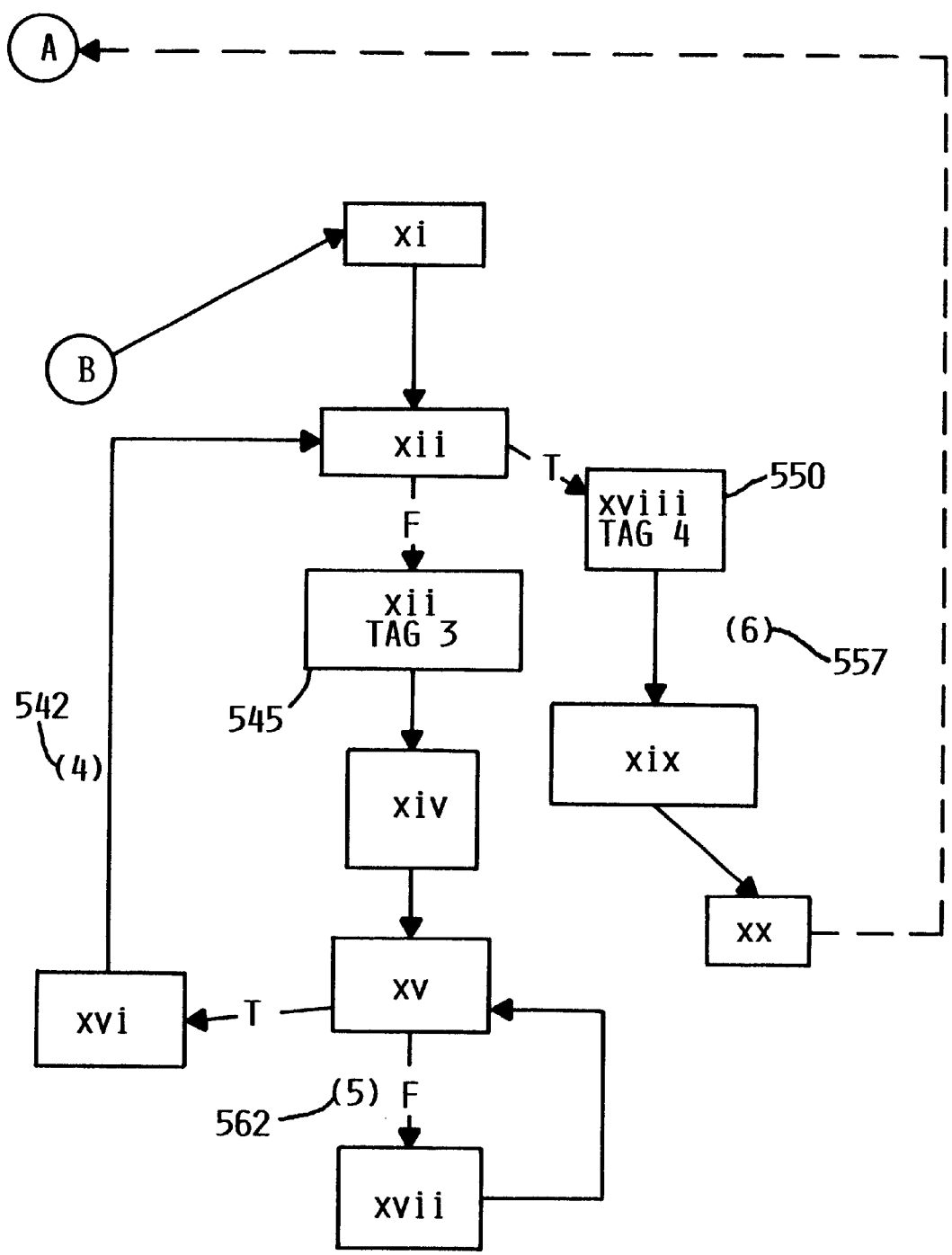

FIG. 6 shows the stored LLCFG_1 with the selected arcs noted. See arcs 502, 517, 532, 542, 562, and 557. Note also that the tag blocks 520, 545, and 550 are annotated with their corresponding tags.

After saving LLCFG_1 in this form, compilation proceeds with low-level optimizations and generation of the final instrumented code, after which the code is executed on sample inputs to gather profile data {blocks 240, 242, 245 of FIG. 2A}.

FIG. 7A shows example captured profile data for the selected arcs. This data will be used for the purposes of explanation in subsequent paragraphs. As shown, the weight for arc 502 is 20; the weight for arc 517 is 95; the weight for arc 532 is 850; the weight for arc 542 is 1900; the weight for arc 562 is 250; and the weight for arc 557 is 100. These weights represent the number of times the corresponding arcs were traversed during sample program execution.

Figures 2, 7B:
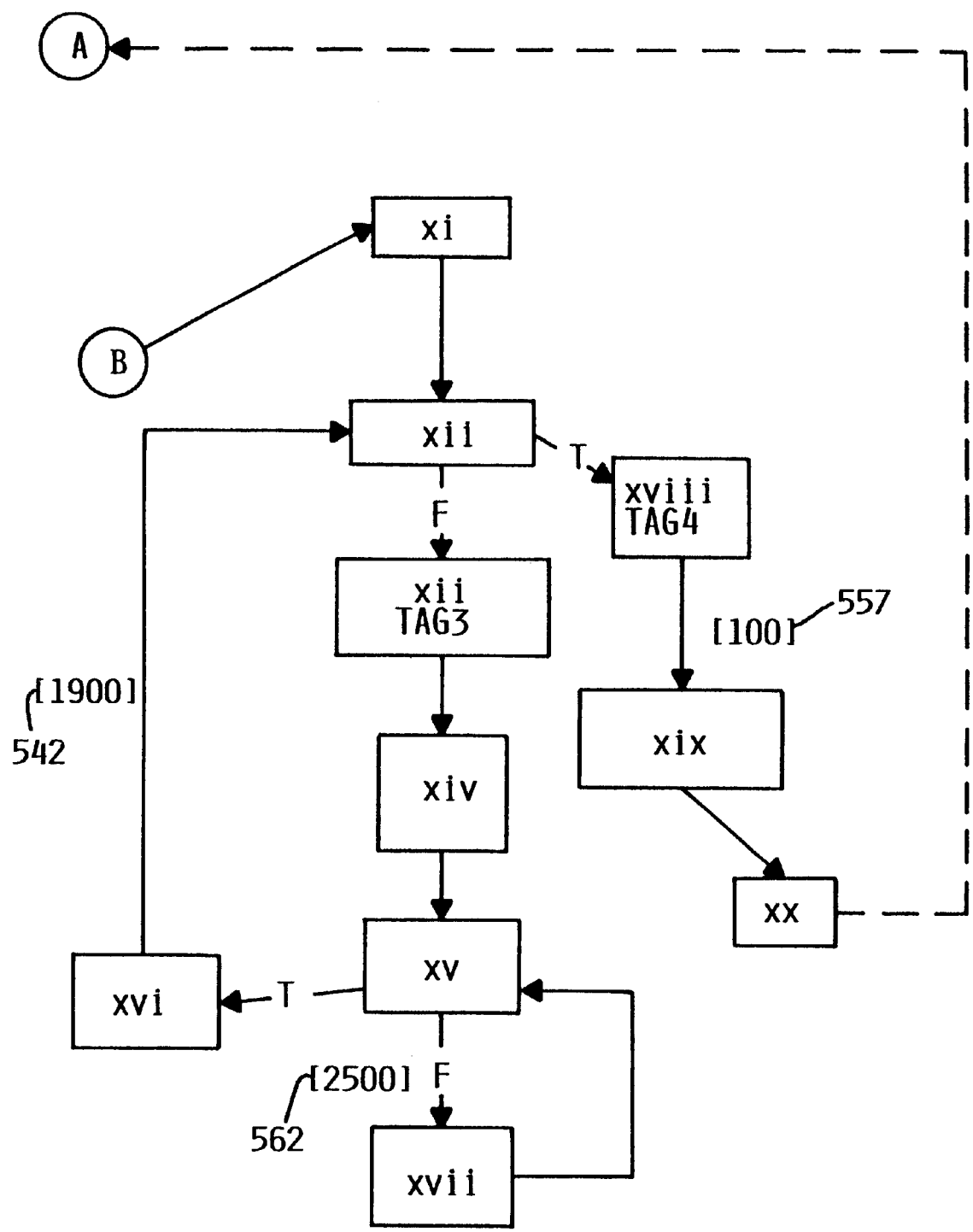

FIG. 7B shows the LLCFG_1 with the collected profile data applied to the selected arcs. Again see arcs 502, 517, 532, 542, 562, and 557. Once the collected data is applied to the selected arcs, the weight for the remaining arcs can be extrapolated (see processing block 257 of FIG. 2B). FIG. 8A shows the LLCFG_1 that results from application of both the collected data and the extrapolated data. Those skilled in the art are familiar with the extrapolation of profile data. Therefore, details regarding how each branch frequency is determined are not included herein. However, by way of example, consider how one would determine the value of the weight for arc 815. The weight for arc 557 is collected profile data and thus is known to be equal to 100. Therefore, the weights for arcs 800, 805 and 810 are known to also be 100. Given that the weight for arc 502 is known to be 20, the weight for arc 810 can be inferred to be 80.

As described above in connection with the discussion of FIG. 2B, once the LLCFG_1 has been fully annotated, it is used to create the tag block weight table for the subject program. The tag block weight table for the program Foo is shown on FIG. 8B. The weights for the tag blocks of program Foo (shown as 820, 825, and 830 on FIG. 8A) are each represented in tag block weight table 850 of FIG. 8B. Note that since tagged arc 317 with tag 2 (see FIG. 3) was eliminated as unreachable, it gets a weight of zero in the tag block weight table.

Figure 9:
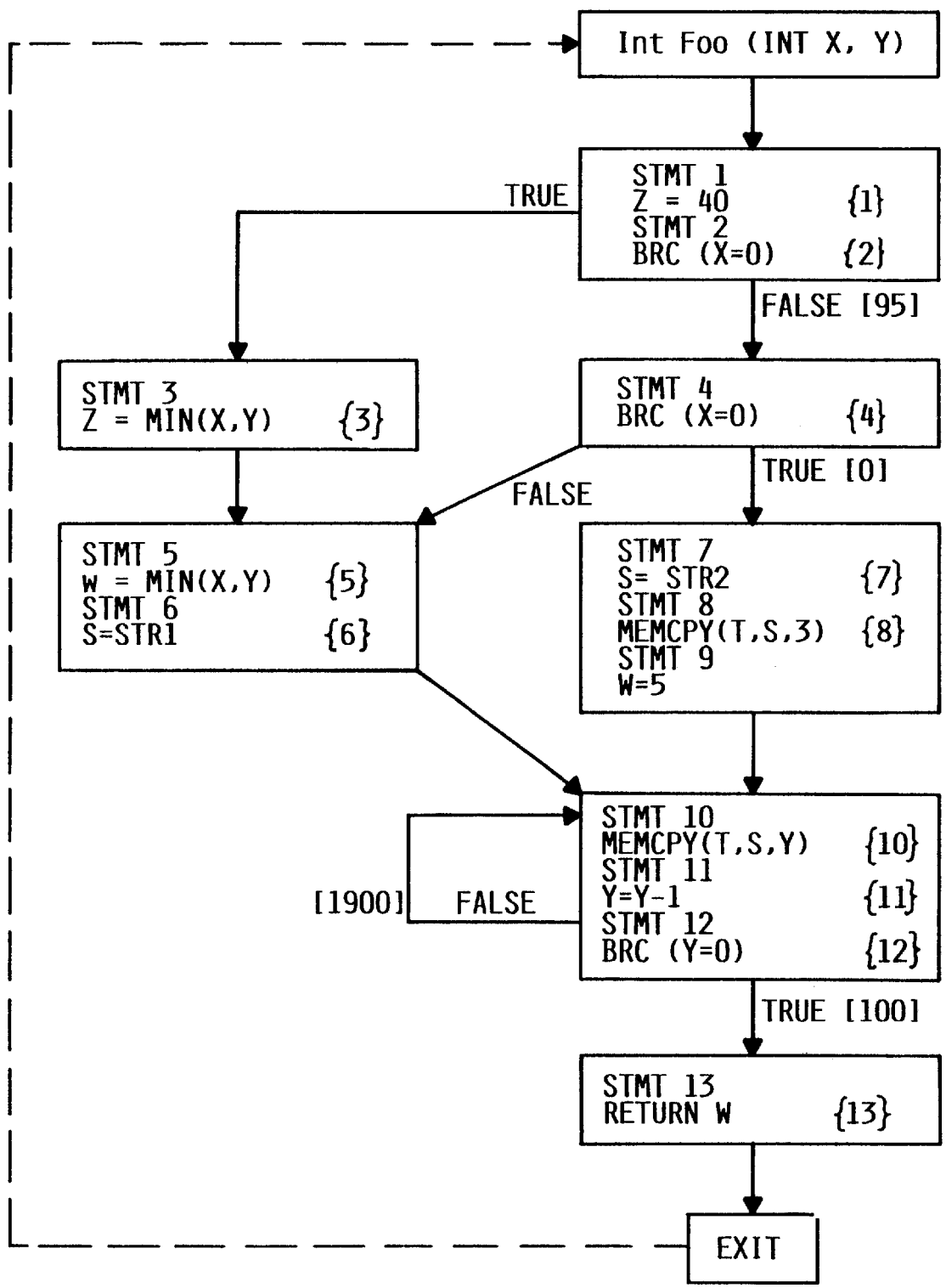
Figure 10:
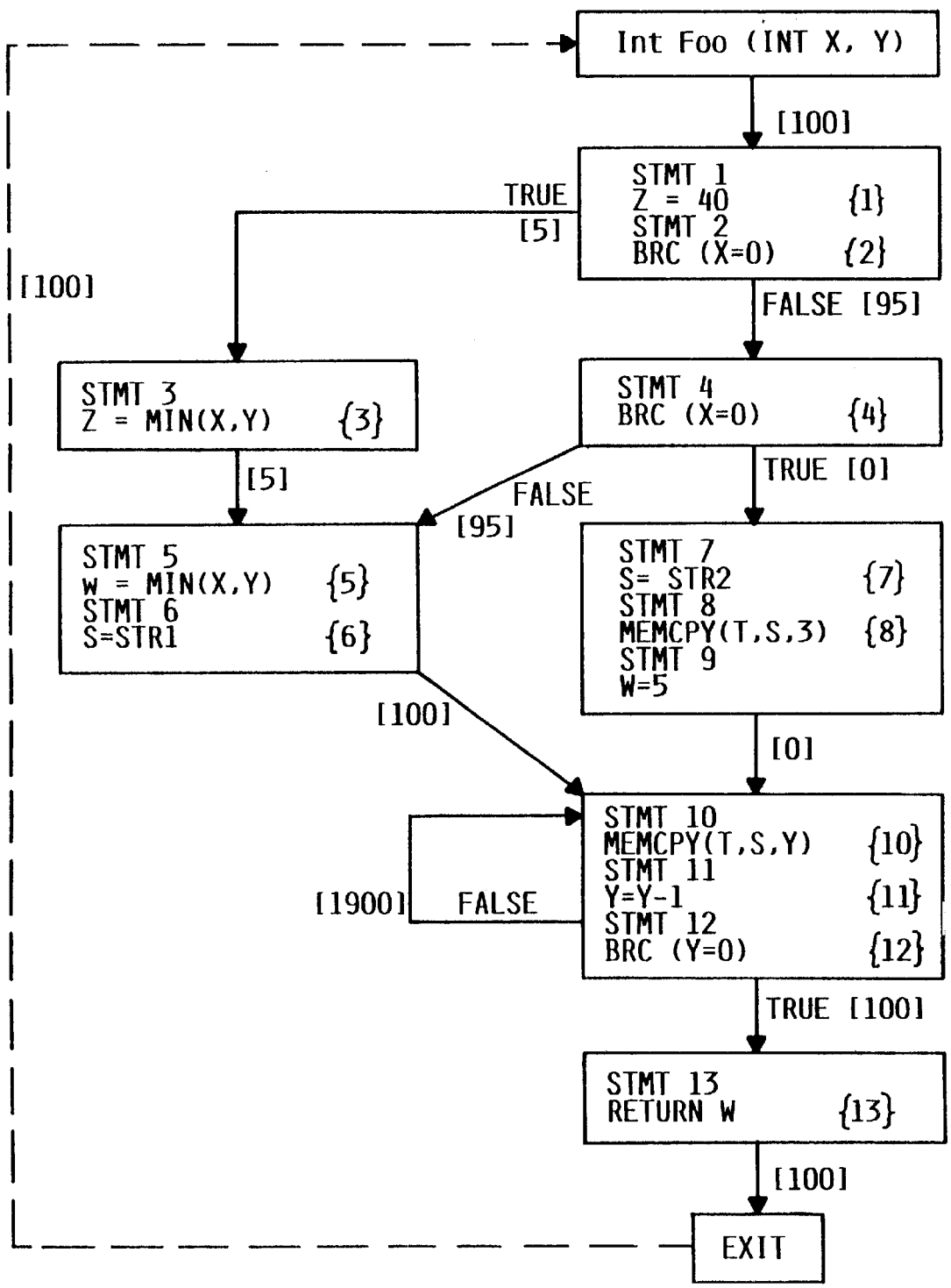
Figure 11:
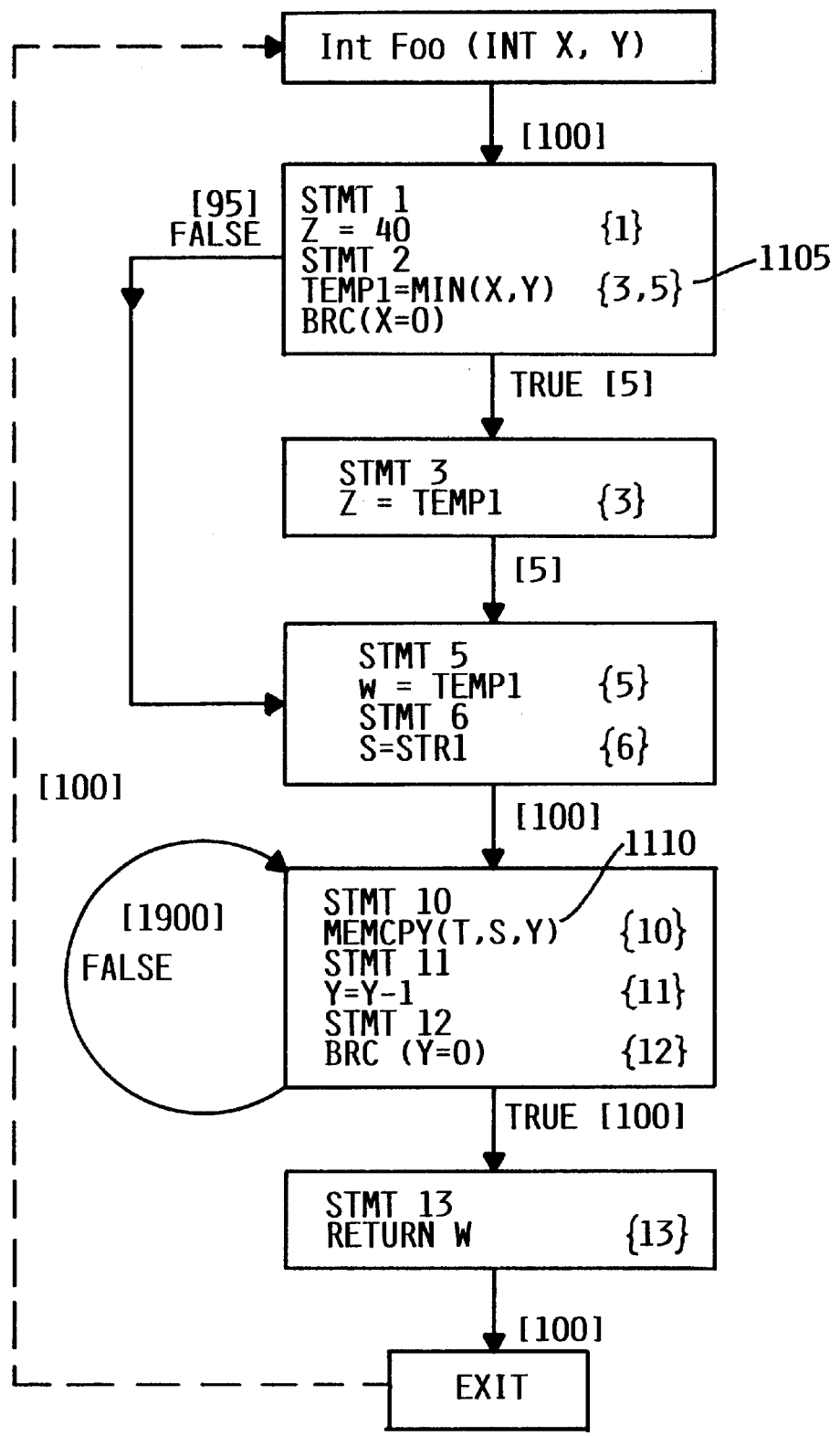
Figure 12A:
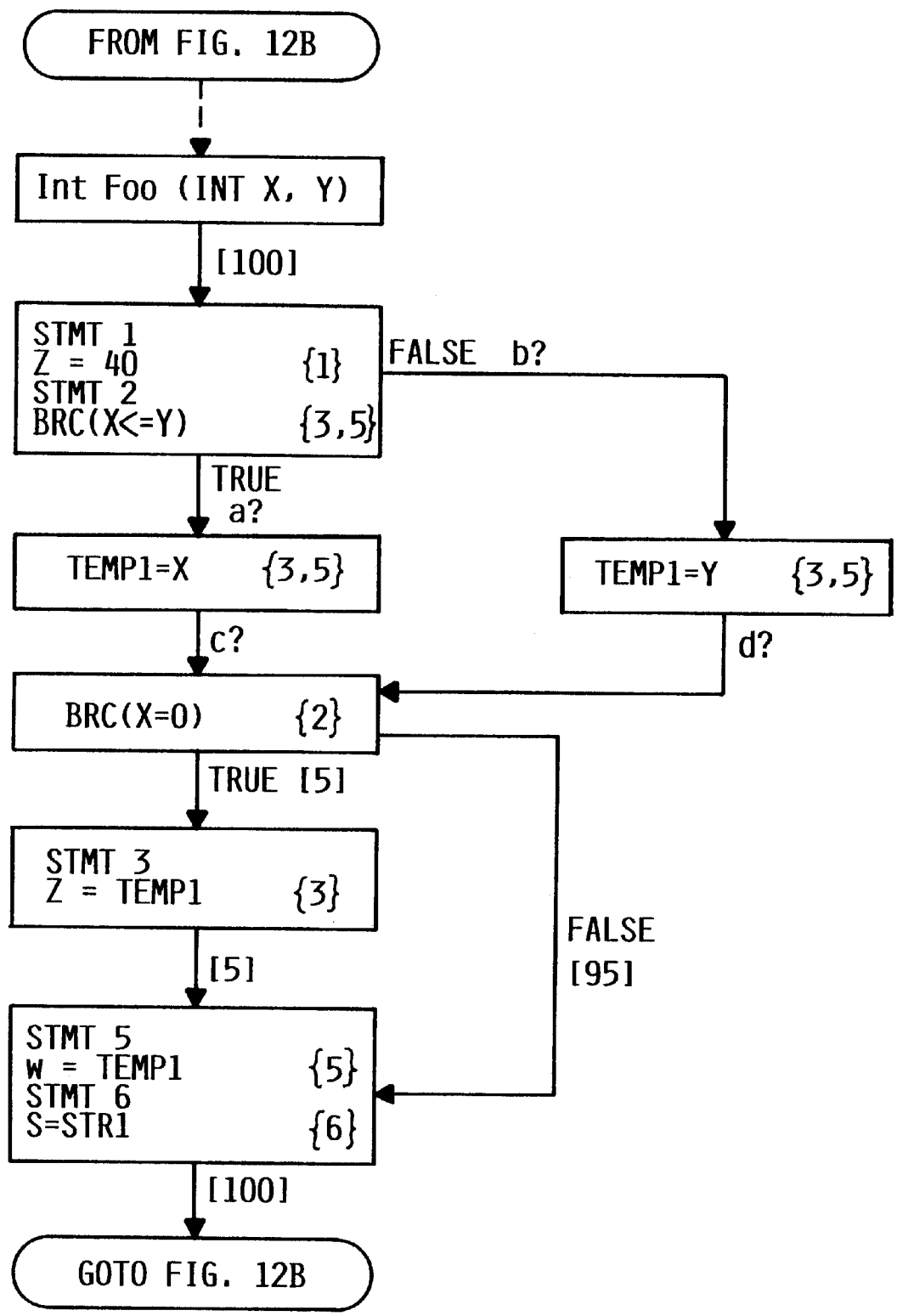
Figure 12B:
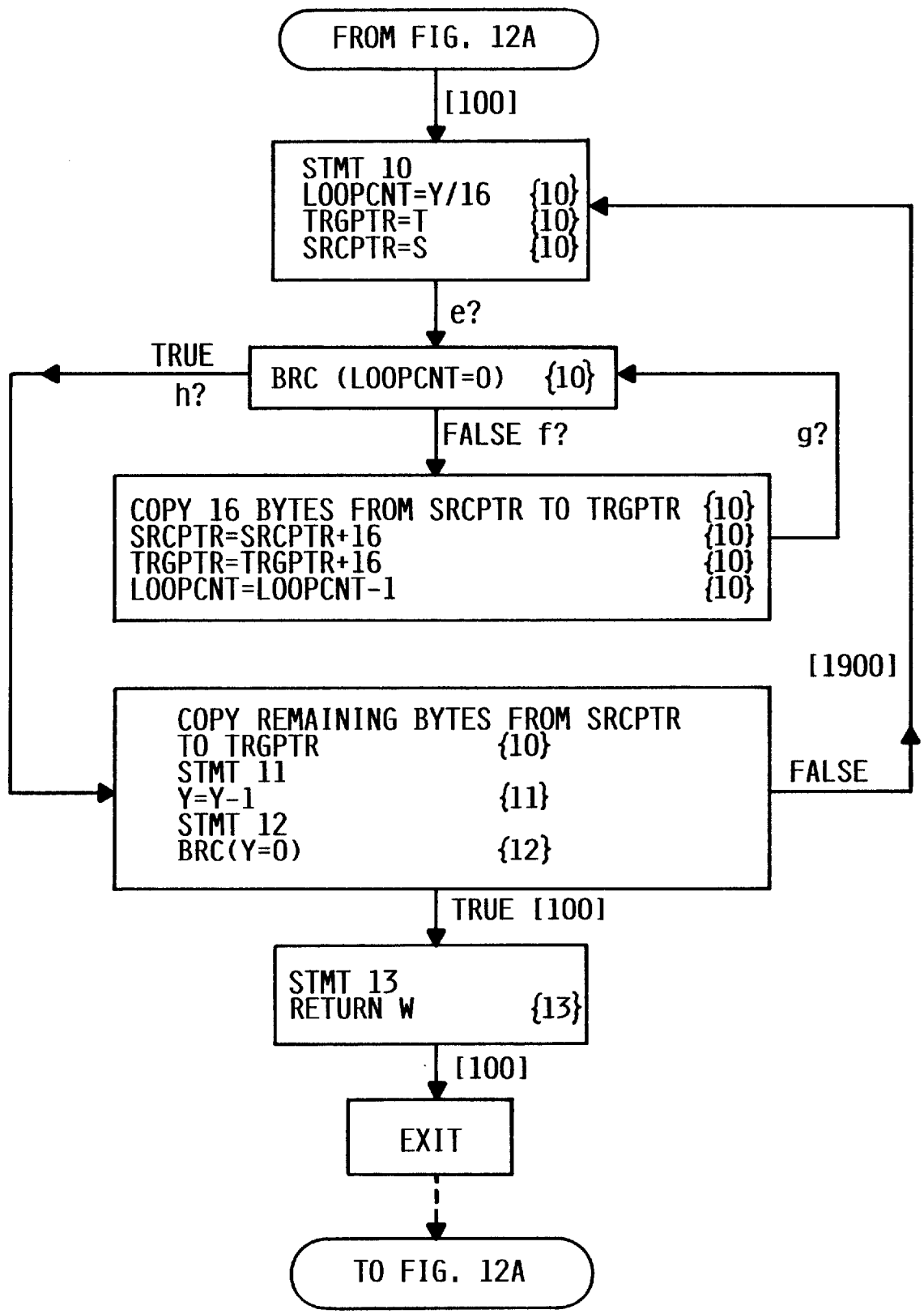

FIG. 9 shows the HLCFG for the program Foo with only the weights from the tag block weight table applied, while FIG. 10 shows the HLCFG for the program Foo with the weights from the tag block weight table applied and with the extrapolated weights applied. FIG. 11 shows the fully weighted HLCFG after the high-level optimizations have taken place. See processing block 263 of FIG. 2B.

To illustrate the point that high-level optimizations may change as a result of profile data, the control flow in FIG. 11 differs slightly from that in FIG. 4. This example assumes that the optimizer chose not to peel the loop containing statements 10, 11, and 12 when profile data was available.

The following text describes how the second version of the low level code and the associated low-level control flow graph (LLCFG_2) are generated. LLCFG_2 is shown on FIGS. 12A and 12B. (See processing blocks 265 and 270 of FIG. 2B.) Note first that unknown weights are represented on FIGS. 12A and 12B as lowercase arc letters followed by the question mark symbol ("?"). The unknown weights are determined as follows (see processing block 275 of FIG. 2B). When generating the low-level code of FIGS. 12A and 12B, two code expansions are encountered on FIG. 11: MIN 1105 expands to create arcs a, b, c, d; and MEMCPY 1110 expands to create arcs e, f, g, h. The value of arc e can be easily inferred by summing its incoming weights: e=1900+ 100=2000. Similarly h=e=2000.

Certain other arcs, however, require code expansion matching. MIN 1105 is associated with statement set {3,5}. This matches code construct 400 in code expansion mapping table 580. Code construct 400 has one branch associated with block ii in LLCFG_1 (see LLCFG_1 of FIG. 8A), where the True path is taken 80 out of 100 times, and the False path is taken 20 out of 100 times. Applying this to the inflow of 100 produces weights of a=c=80 and b=d=20.

MEMCPY 1110 is associated with statement set {10}. This code construct matches two code constructs of code expansion mapping table 580. The code constructs have branches that are respectively associated with blocks ix and xv in FIG. 8A (i.e., of LLCFG_1). The True path is taken (100+1900)/(4400+950)=37% of the time, and the False path is taken (850+2500)/(4400+950)=63% of the time. Applying these percentages to FIG. 12A yields the following:

$$f=0.63(2000+g)$$

$$g=f$$

Solving for f yields: f=g=3405.

An alternative solution would be to average the True/ False percentages of the matching code constructs. In ix, th True path is taken 11% of the time, and in xv, the True path is taken 43% of the time. Averaging these gives True taken 27% of the time and False taken 73% of the time. Applying these percentages to FIG. 12A yields the following:

$$f=0.73(2000+g)$$

$$g=f$$

Solving for f yields: f=g=5407.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for optimizing a program, said method comprising the steps of:

analyzing N branching structures for said program, each said branching structure being a different representation of said program;

collecting profile data once for said program;

applying said profile data to each of said N branching structures so that an optimized branching structure is created; and optimizing said program based on said profile data and said optimized branching structure.

2. A method for optimizing a program, said method comprising the steps of:

identifying one or more first branches within a first branching structure of said program;

instrumenting second branches within a second branching structure of said program;

collecting profile data based on said instrumentation step;

applying said profile data to said first branching structure at said first branches;

optimizing said program based on said first branching structure and thereby creating a third branching structure;

applying said profile data to said third branching structure; and optimizing said program based on said third branching structure.

3. The method of claim 2 wherein said step of identifying first branches comprises the steps of:

performing arc selection on a control flow graph that represents said first branching structure so as to select said one or more first branches; and marking said one or more first branches.

4. The method of claim 2 wherein said instrumenting step comprises the steps of;

creating said second branching structure by optimizing said first branching structure; and performing arc selection on said second branching structure to select said one or more second branches;

instrumenting said one or more second branches; and optimizing said program.

5. The method of claim 2 wherein said step of applying said profile data further comprises the step of applying extrapolated profile data to said first branching structure.

6. A program product for optimizing a program, said program product comprising:

signal bearing media; and a program stored on said signal bearing media that is configured to carry out the steps of:

analyzing N branching structures for said program, each said branching structure being a different representation of said program;

collecting profile data once for said program;

applying said profile data to each of said N branching structures so that an optimized branching structure is created; and optimizing said program based on said profile data and said optimized branching structure.

7. A program product for optimizing a program, said program product comprising:

signal bearing media; and a program stored on said signal bearing media that is configured to carry out the steps of:

identifying one or more first branches within a first branching structure of said program;

instrumenting second branches within a second branching structure of said program;

collecting profile data based on said instrumentation step;

applying said profile data to said first branching structure at said first branches;

optimizing said program based on said first branching structure and thereby creating a third branching structure;

applying said profile data to said third branching structure; and optimizing said program based on said third branching structure.

8. The program product of claim 7 wherein said step of identifying first branches comprises the steps of:

performing arc selection on a control flow graph that represents said first branching structure so as to select said one or more first branches; and marking said one or more first branches.

9. The program product of claim 7 wherein said instrumenting step comprises the steps of:

creating said second branching structure by optimizing said first branching structure; and performing arc selection on said second branching structure to select said one or more second branches;

instrumenting said one or more second branches; and optimizing said program.

10. The program product of claim 7 wherein said step of applying said profile data further comprises the step of applying extrapolated profile data to said first branching structure.

11. The program product of claim 7 wherein said signal bearing media is transmission-type media.

12. The program product of claim 7 wherein said signal bearing media is recordable media.

13. An apparatus, said apparatus comprising:

a processor;

memory connected to said processor; and a translator stored in said memory, said translator being configured to carry out the steps of:

analyzing N branching structures for said program, each said branching structure being a different representation of said program;

collecting profile data once for said program;

applying said profile data to each of said N branching structures so that an optimized branching structure is created; and optimizing said program based on said profile data and said optimized branching structure.

14. An apparatus, said apparatus comprising:

a processor;

memory connected to said processor; and a translator stored in said memory, said translator being configured to carry out the steps of:

identifying one or more first branches within a first branching structure of said program;

instrumenting second branches within a second branching structure of said program;

collecting profile data based on said instrumentation step;

applying said profile data to said first branching structure at said first branches;

optimizing said program based on said first branching structure and thereby creating a third branching structure;

applying said profile data to said third branching structure; and optimizing said program based on said third branching structure.

15. The method of claim 14 wherein said step of identifying first branches comprises the steps of:

performing arc selection on a control flow graph that represents said first branching structure so as to select said one or more first branches; and marking said one or more first branches.

16. The method of claim 14 wherein said instrumenting step comprises the steps of;

creating said second branching structure by optimizing said first branching structure; and performing arc selection on said second branching structure to select said one or more second branches;

instrumenting said one or more second branches; and optimizing said program.

17. The method of claim 14 wherein said step of applying said profile data further comprises the step of applying extrapolated profile data to said first branching structure.

* * * * *